United States Patent [19]

Winter

[11] Patent Number: 4,817,730
[45] Date of Patent: Apr. 4, 1989

[54] HYDRAULIC WEIGHT TRANSFER SYSTEM FOR AN IMPLEMENT WITH A LIFT ASSIST WHEEL

[75] Inventor: David C. Winter, Johnston, Iowa
[73] Assignee: Deere & Company, Moline, Ill.
[21] Appl. No.: 156,041
[22] Filed: Feb. 16, 1988
[51] Int. Cl.⁴ ............................................. A01B 63/22
[52] U.S. Cl. .................................. 172/328; 172/445; 172/448
[58] Field of Search ............... 172/328, 445, 448, 439, 172/449, 451, 458, 413, 396, 7; 280/43.23, 405 B, 446 A, 456 A, 460 A, 461 A, 475, 479 R

[56] References Cited

U.S. PATENT DOCUMENTS

| | | | |
|---|---|---|---|
| 3,207,233 | 9/1965 | Shumaker | 280/461 A X |
| 3,258,075 | 6/1966 | Ashfield | 172/445 X |
| 3,450,220 | 6/1969 | Frandson et al. | 280/479 R X |
| 3,463,510 | 8/1969 | Van Syoc | 172/7 X |
| 3,542,135 | 11/1970 | McCanse | 172/445 X |
| 3,583,495 | 6/1971 | Cantral et al. | 172/449 X |
| 4,193,458 | 3/1980 | Meinert et al. | 172/328 |
| 4,434,857 | 3/1984 | Basrai | 172/328 |

OTHER PUBLICATIONS

Operator's Manuel #OM-N200078 Issue I5 for John Deere 845 Series Folding Row-Corp. Cultivater.
U.S. patent application Ser. No. 07/101,873 filed 28 Sep. 1987 of Steve A. Junge et al., assigned to Deere & Company.

*Primary Examiner*—Richard J. Johnson
*Assistant Examiner*—Jeffrey L. Thompson

[57] ABSTRACT

An improved hydraulic circuit for raising and lowering a three-point hitch-mounted implement having a lift assist assembly and for selectively lowering the lower draft links of the three-point hitch to transfer implement weight to the rear wheels of the tractor without affecting the normal operation of the tractor operator control valve. A shuttle valve connects the rockshaft control valve, which otherwise would be disabled, to the rockshaft cylinder which controls the lower draft links. The ball-check valve also connects the rockshaft cylinder to the operator control valve while isolating the rockshaft control valve from the operator control valve.

7 Claims, 1 Drawing Sheet

HYDRAULIC WEIGHT TRANSFER SYSTEM FOR AN IMPLEMENT WITH A LIFT ASSIST WHEEL

BACKGROUND OF THE INVENTION

The present invention relates generally to agricultural implements, and more specifically, to a hydraulic circuit utilized with an integrally mounted implement which permits the normally disabled rockshaft control lever on the tractor to be used to raise the tractor hitch without affecting the rest of the lift assist circuit.

On wide agricultural implements such as row crop cultivators or rotary hoes, the implement tool bar or main frame is connected to the tractor by a three-point hitch. When the tractor hitch is raised to move the implement to the transport position, the entire weight of the implement is transferred to the rear of the tractor which results in partial or complete loss of steering control. To avoid this problem, many large integral implements are fitted with a hydraulically actuated lift assist wheel to reduce the weight transferred to the tractor during transport. Such a system is shown, for example in U.S. Pat. No. 4,193,458 and on commercially available implements such as the John Deere Model 845 Series folding row-crop cultivator. With implements such as the 845 Series row-crop cultivator, implement weight is carried by implement frame gauge wheels when the implement is in the field-working position Such an arrangement limits tractor traction If the operator attempts to raise the tractor hitch to try to transfer some of the load to the rear of the tractor, the tractor center link of the three-point hitch goes slack and the lift assist wheel lowers. Operation of the implement under such conditions is undesirable since the slack center link fails to hold the implement parallel to the ground and the lowered lift assist wheel leaves a track in the field which is unacceptable to the farmer. The rockshaft control lever is essentially useless while the implement is in the field-working position.

In other types of hydraulic circuits for implements with lift assist wheels, such as explained in U.S. Pat. No. 4,193,458 with respect to the John Deere Model 7100 mounted Max-Emerge planter, the operator must synchronize two separate control levers to elevate the implement lift assist wheel and the tractor three-point hitch for transport of the implement. With such a structure, damage to the hitch and implement can result if the cylinders are not operated in near synchronization. Also, such an arrangement requiring simultaneous movement of two levers is more difficult for the farmer to operate.

BRIEF SUMMARY OF THE INVENTION

It is therefore an object of the present invention to provide an improved hydraulic circuit for an integrally mounted implement with a lift assist arrangement. It is a further object to provide such a hydraulic circuit which permits the weight of the implement to be selectively shifted to the rear wheels of the tractor during the field-working operation. It is a further object to provide such a circuit wherein weight transfer is achieved in the field-working position without lowering the lift assist wheel into ground engagement.

It is yet another object of the present invention to provide an improved hydraulic circuit in combination with an integrally mounted implement with a lift assist wheel, wherein the tractor rockshaft control lever can be used to raise the tractor hitch and transfer weight to the rear wheels of the tractor during field-working operations without affecting the remainder of the lift assist circuitry. It is a further object to provide such structure wherein the main raise and lower function is still performed with a single tractor control lever.

It is a further object of the present invention to provide a system with an improved hydraulic circuit for an integrally mounted implement having a lift assist wheel wherein a weight transfer function is provided while maintaining simplicity of operation of the entire system. It is still another object to provide such a system which better utilizes the available hydraulic controls on a tractor. It is still another object to provide such system with a hydraulic circuit, wherein the weight transfer function is provided without lowering the lift assist wheel into contact with the ground during field-working operations. It is yet another object to provide such a system which upon lowering the implement to the ground-working position automatically returns the hitch links to a preselected weight transfer position, even after a complete raise and lower cycle.

It is another object of the present invention to provide an improved hydraulic circuit in combination with a three-point hitch mounted implement with a lift assist wheel which maintains the center link of the three-point hitch rigid and the lift assist wheel raised from ground engagement while permitting the lower draft links to be adjusted vertically during field-working operations to transfer weight to and from the rear wheels of the tractor as desired. It is a further object to provide such a circuit which is relatively simple in construction. It is a further object to provide such a circuit which utilizes the rockshaft control lever of the tractor in addition to the normal operator control valve on the tractor. It is still another object to provide such a circuit wherein the main raise and lower functions are still performed with the main tractor control lever.

In accordance with the above objects, both the output port of the rockshaft control valve and one of the output ports of the operator control valve are connected through a shuttle valve to the single-acting rockshaft cylinder. The output port on the operator control valve is also connected to the arm cylinder on the lift assist wheel arm so that when the output port on the operator control valve is pressurized, the rockshaft and arm cylinders will operate essentially in parallel to raise the lower draft links and at the same time lower the lift assist wheel to raise the implement toward the transport position. The second output port on the operator control valve is connected to the opposite side of the arm cylinder and to one end of the link cylinder such that when the second port is pressurized, the link and arm cylinders operate essentially in parallel to cause the center link to go rigid and to raise the lift assist wheel to a position above the ground. At the same time, the first operator control valve port is returned to reservoir so that the rockshaft permits the lower draft links to lower until the gauge wheel on the frame contacts the ground. Normally in this position of the operator control valve, the weight of the implement is carried on the frame gauge wheel and not on the rear of the tractor.

If the operator desires to shift some of the weight of the implement onto the rear tractor wheels, for example, when the needs to increase traction on the tractor to reduce slippage, the moves the rockshaft control valve to pressurize the output port on the rockshaft control valve thereby directing fluid under pressure through the shuttle valve and into the rockshaft cylinder to lift the lower draft links. The shuttle valve operates to direct the highest pressure fluid into the rockshaft and prevent fluid from flowing into the remaining line. Therefore, the rockshaft control valve can be used to raise the tractor hitch without affecting the rest of the lift assist circuit. The operator control valve still controls the main raise and lower function. Once the control lever on the rockshaft control valve is set, the rockshaft will return to the previously established position to provide a preselected weight transfer to the rear wheels of the tractor, even after a complete raise and lower cycle is completed. The amount of weight transferred can be changed as desired by simply repositioning the rockshaft lever.

These and other objects, features and advantages of the present invention will become apparent to those skilled in the art from the description which follows and from the drawings.

DESCRIPTION OF THE PREFERRED EMBODIMENT

Figure 1:
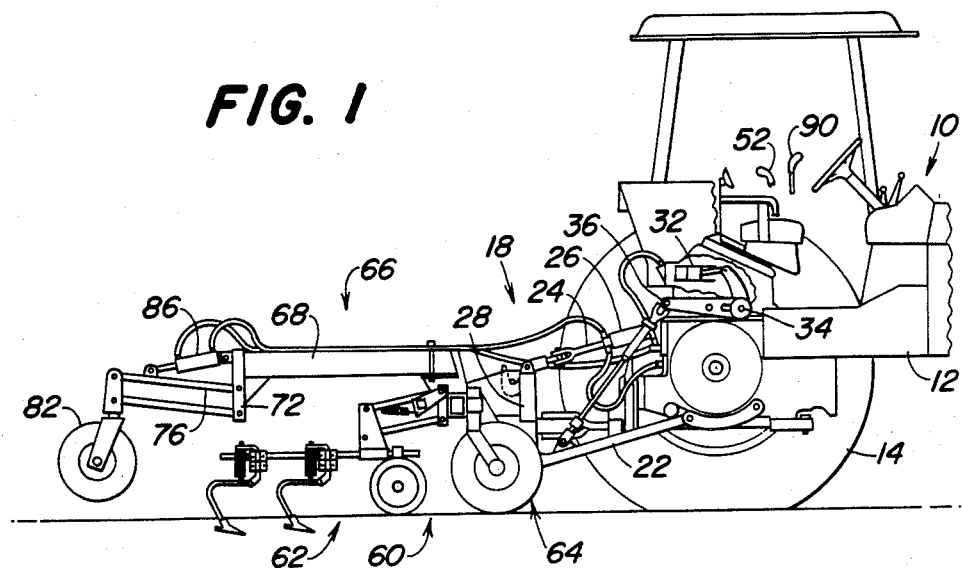
FIG. 1 is a side view of the tractor and implement with the hydraulic circuit of the present invention attached thereto, and with portions of the tractor removed to better show the three-point hitch and the rockshaft hydraulic cylinder.

Referring to FIG. 1, therein is shown a tractor 10 having a main frame 12 supported for forward movement over the ground by front steerable wheels (not shown) and by rear drive wheels 14. The tractor 10 also includes conventional three-point hitch structure 18 having a pair of transversely spaced lower draft links 22 pivotally connected at their forward ends to the tractor frame 12. The hitch 18 also includes an upper center link 24 including a hydraulic link cylinder 26. The links 22 and 24 are connected to a conventional tractor quick coupler 28, and link length is chosen such that the coupler 28 raises and lowers generally perpendicular to the ground.

Figure 2:
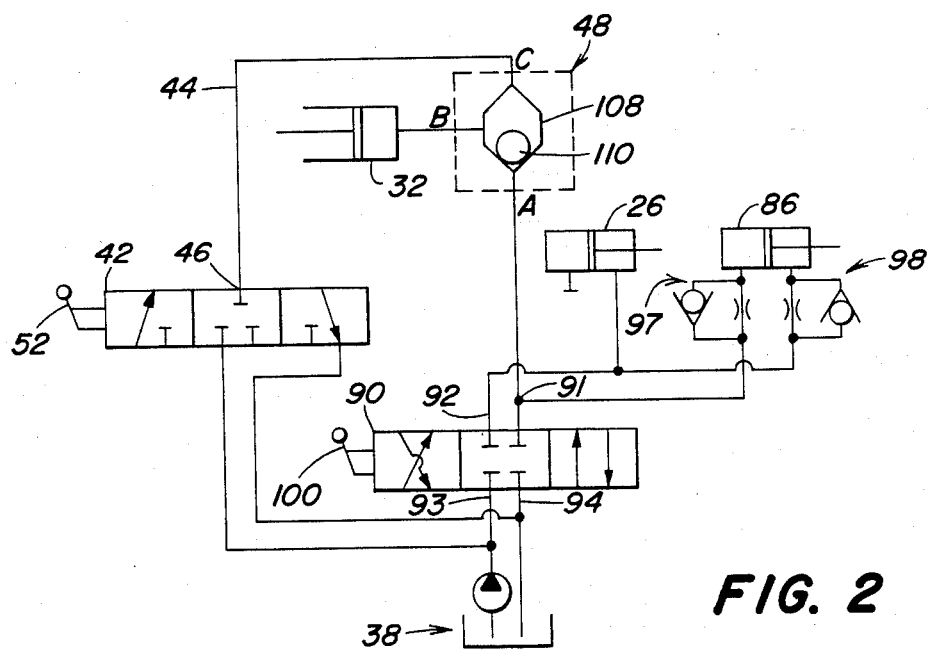
FIG. 2 is a schematic of the hydraulic circuit utilized with the structure of FIG. 1.

A single acting rockshaft cylinder 32 is contained within the rear of the tractor 10 and is connected through a rockshaft 34 and lift linkages 36 to the lower draft links 22. The rockshaft cylinder 32 is connected to a source of hydraulic fluid 38 (FIG. 2) through a rockshaft control valve 42 via a rockshaft line 44 connected to output port 46 of the valve 42 and to a pressure responsive valve 48. The rockshaft control valve 42 is of conventional construction and includes a control lever 52, the position of which controls the movement of the rockshaft cylinder and establishes the position of the rockshaft 34. For example, as shown in FIG. 2, the valve 42 is in the neutral position, and the rockshaft 34 will normally remain in the same position. By moving the valve 42 to the right as shown in FIG. 2, fluid under pressure from the source 38 will be communicated through the output port 46, line 44 and valve 48 to the rockshaft cylinder 32 to extend the cylinder and raise the lower links until the cylinder reaches a preselected position dependent on the position of the lever 52. When the preselected position is reached, the control valve 42 will return to the neutral position. Moving the control lever 52 in the opposite direction normally causes the rockshaft cylinder 32 to retract and lower the draft links 22 until the rockshaft 34 reaches another preselected position again dependent upon the position of the control lever 52.

As shown in FIG. 1, the tractor quick coupler 28 is connected to the frame or toolbar of a tillage implement 60, shown here as a row-crop cultivator having a plurality of transversely spaced cultivator rigs 62 mounted on the frame. A gauge wheel 64 is mounted on the frame and maintains the frame a preselected distance above the ground when the implement 60 is in the field-working position as shown in FIG. 1.

Connected to the frame is a lift assist assembly 66 for reducing the amount of weight transferred to the tractor when the implement is raised to the transport position. The assembly 66 includes a rearwardly extending beam 68 rigidly connected at its forward end to the frame. At the aft end of the beam 68, a bracket 72 extends downwardly and supports a pair of parallel links 76 connected to a wheel support which carries a lift assist wheel 82. A double acting hydraulic arm cylinder 86 is connected between the upper end of the bracket 72 and the upper parallel link 76 for selectively raising and lowering the lift assist wheel 82.

As best seen in FIG. 2, the hydraulic circuitry for operating the cylinders includes an operator control valve 90 having first and second output ports 91 and 92, respectively, and input ports 93 and 94 connected to the pressure and reservoir sides, respectively, of the hydraulic source 38. The first output port 91 is connected to the cylinder end of the arm cylinder 86 and to the rockshaft cylinder 32 through the valve 48. The second output port 92 is connected to the rod ends of the link cylinder 26 and the arm cylinder 86 for operation of the cylinders 26 and 86 generally in parallel when the port 92 is pressurized. Conventional flow control structures 97 and 98 each including a one-way check valve and a restrictor are connected between the cylinder and rod ends of the arm cylinder 86 to limit the speed at which the lift assist wheel 82 raises and lowers. A control lever 100 is located on the tractor for moving the control valve 90 from the neutral position (as shown in FIG. 2) to either the "raise" position (to the right as viewed in FIG. 2) or to the "lower" position (to the left).

With exception of the valve means 48 and the rockshaft line 44 connecting the rockshaft control valve 42 through the valve means 48 to the rockshaft cylinder 32, the hydraulic circuit is generally of conventional construction and of the type utilized with conventionally available hydraulic systems for implements with lift assist assemblies. When the control lever 100 is positioned to the right as viewed in FIG. 2 to pressurize the output port 91, the arm cylinder 86 will extend to lower the lift assist wheel 82 to the ground; at the same time the rockshaft cylinder 32 is extended to raise the lower draft links 22. Therefore, the implement will be raised by the lower draft links 22 with the help of the lift assist assembly 66. Simultaneously the output port 92 is returned to reservoir so that the center link cylinder 26 will be slack to permit the center link 24 to change lengths as necessary so the implement 60 and lift assist assembly 66 can pivot about the connection with the lower draft links 22 during transport over uneven terrain.

When the operator is ready to lower the implement to the ground-working position, he moves the control lever 100 to the left (as viewed in FIG. 2) to pressurize the output port 92 and return the port 91 to reservoir. The center cylinder 26 and the arm cylinder 86 will be retracted essentially in parallel, and the rockshaft cylinder 32 will retract under the weight applied to the lower draft links 22 until the frame gauge wheel 64 contacts the ground (assuming that the rockshaft valve lever 52 is in the fully lowered position). The hydraulic link cylinder 26 will assume a solid retracted position to maintain the coupler 28 perpendicular to the ground. The arm cylinder 86 will be completely retracted so that the lift assist wheel 82 will be lifted a substantial distance above the ground and will not interfere with the crop.

As shown in FIG. 2, the valve means 48 includes a ball-check valve 108 which permits the rockshaft control valve, which otherwise would be disabled, to be connected to the rockshaft cylinder 32 without affecting the normal raise and lower operation associated with the control valve 90. The ball-check valve 108 includes a ball 110, inputs A and C, and an output B connected to the rockshaft cylinder 32. The ball 110 is biased by gravity (or, alternatively, with a spring) towards input A when inputs A and C are unpressurized. Input A is connected to the output port 91 of the operator control valve 90 and input C is connected to the rockshaft line 44 which in turn is connected to the output 46 of the rockshaft control valve 42. The ball-check valve 108 communicates the highest of the pressures appearing at the inputs A and C to the rockshaft cylinder 32. In the field-working position of the implement, the valve 90 is in the neutral position and the port 91 is under no pressure so that the input A is unpressurized. Therefore, if the operator wishes to increase the load on the rear wheels 14 of the tractor 10, he simply moves the rockshaft control lever 52 to the right as viewed in FIG. 2 to apply pressure to the input C to extend the rockshaft cylinder 32 and lift the lower draft links 22. The ball-check valve 108 prevents fluid pressure from being communicated through the valve means 48 to the output port 91. The rockshaft valve 42 is controlled such that it returns to the neutral position as shown in FIG. 2 when the rockshaft cylinder 32 reaches a preselected position dependent upon the position of the rockshaft control lever 52. Once weight is transferred to the tractor, pressure is required in line 44 to hold the links 22 in place. Movement of the valve 90 to the "raise" position reduces the load on rockshaft 32, and the pressure at A causes the ball 110 of the check valve 108 to move from port A to port C. Hydraulic fluid under pressure is communicated through the valve means 48 to the rockshaft cylinder 32 to rotate the rockshaft 34 and lift the lower draft links 22 at the same time the arm cylinder 86 is extended. The ball 100 prevents fluid under pressure from being communicated through the input port C to the rockshaft control valve 42.

Once the rockshaft control lever 52 is set at a preselected position to apply a given amount of weight to the rear wheels 14 of the tractor 10, the lower draft links 22 will return to this preselected location, even after a complete raise and lower cycle. This results from the fact that the port 91 and thus the input A of the shuttle valve 108 is returned to reservoir while the implement is being lowered, and as the rockshaft 34 tries to lower beyond the position established by the rockshaft control lever 52, the rockshaft control valve 42 will be moved to the right as viewed in FIG. 2 to pressurize the input C and prevent the rockshaft cylinder 32 from retracting further. This preselected position may be adjusted as desired by simply moving the rockshaft control lever 52. Therefore, the valve 42, which otherwise would be disabled, can be used to transfer weight to the rear wheels 14 without affecting the normal raise and lower functions of the operator control valve 90.

Having described the preferred embodiment, it will be apparent that modifications can be made without departing from the scope of the invention as defined in the accompanying claims.

I claim:

1. In combination, a tractor having a three-point hitch including a pair of lower draft links and an upper center link;
    means for rocking the lower draft links vertically including a single-acting rockshaft cylinder;
    an implement carried by the three-point hitch;
    a lift assist assembly connected to the implement and including an arm, a ground wheel supported by the arm and a hydraulic arm cylinder connected to the arm for rocking the arm vertically to raise and lower the wheel relative to the implement;
    hydraulic control means for operating the arm cylinder and the rockshaft cylinder generally in parallel to raise the lower draft links and to lower the ground wheel to thereby raise the implement on the draft links and the lift assist wheel, said hydraulic control means including means for operating the arm cylinder and the rockshaft cylinder to lower the draft links while raising the lift assist wheel to a position out of contact with the ground, and wherein said hydraulic control means further includes valve means connected to the rockshaft cylinder and a rockshaft control valve connected to the valve means, and wherein said valve means includes means for communicating fluid under pressure from the rockshaft control valve to the rockshaft cylinder for lifting the lower draft links to shift implement weight to the tractor without operating the arm cylinder.

2. The invention as set forth in claim 1 wherein the hydraulic control means includes an operator control valve with first and second output ports, the valve means comprises a pressure responsive valve having first and second input ports and an output port connected to the rockshaft cylinder, and wherein said first output port of the operator control valve is connected to the arm cylinder and to one of the input ports of the valve means, and the rockshaft control valve includes an output port connected to the second input port of the pressure responsive valve.

3. The invention as set forth in claim 2 wherein the upper center link includes a hydraulic link cylinder, and including means for connecting the link cylinder to the second output port of the operator control valve and to one side of the arm cylinder for moving the link cylinder to a solid retracted position as the lift assist wheel is raised above the ground.

4. The invention as set forth in claim 2 wherein the pressure responsive valve comprises means for selectively communicating fluid, from one of the rockshaft control valve and the operator control valve, to the rockshaft cylinder such that the fluid at the highest pressure is selected, and wherein said rockshaft control valve includes valve operating means for supplying fluid under pressure to the pressure responsive valve to prevent the lower draft links from lowering beyond a preselected position.

5. In combination, a tractor having a three-point hitch including a pair of lower draft links and an upper center link;

means for rocking the lower draft links vertically including a single-acting rockshaft cylinder;

said upper center link including a hydraulic link cylinder;

an implement carried by the three-point hitch;

a lift assist assembly connected to the implement and including an arm, a ground wheel supported by the arm and a hydraulic arm cylinder connected to the arm for rocking the arm vertically to raise and lower the wheel relative to the implement;

a hydraulic fluid system including a source of pressure and a reservoir, an operator control valve having first and second output ports and positionable means for selectively connecting the output ports alternately to the source of pressure and the reservoir, first conduit means coupling the first output port to the rockshaft cylinder and to the arm cylinder for operating the rockshaft and arm cylinders in parallel when the control means is positioned to connect the source to the first output port, second conduit means coupling the second output port to the link cylinder and arm cylinder for operating the link and arm cylinders in parallel when the control means is positioned to connect the source to said second port, valve means connected to the rockshaft cylinder, rockshaft control means connected between the source and the valve means for controlling the rockshaft cylinder independently of the operator control when the operator control is positioned with the first output port unconnected to the source of pressure so that the lower draft links are movable vertically independently of the arm and link cylinders.

6. The invention as set forth in claim 5 wherein the valve means comprises a check valve having a first input connected to the rockshaft control means and a second input connected to the first output port.

7. The invention as set forth in claim 5 wherein the rockshaft control means includes means for selecting a lowermost draft link position which transfers a preselected portion of the implement weight to the tractor, said lowermost draft link position being independent of the operation of the operator control valve.

* * * * *